(12) United States Patent
Oki et al.

(10) Patent No.: US 6,495,489 B1
(45) Date of Patent: Dec. 17, 2002

(54) ACID RESISTANT CATALYST SHEET AND PROCESS FOR PRODUCING SAME

(75) Inventors: Yasuyuki Oki, Niihama (JP); Hironobu Koike, Niihama (JP); Yoshiaki Takeuchi, Niihama (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/627,059

(22) Filed: Jul. 27, 2000

(30) Foreign Application Priority Data

Jul. 29, 1999 (JP) ............................................ 11-215237

(51) Int. Cl.$^7$ ................................................ B01J 23/00
(52) U.S. Cl. .................... 502/350; 502/242; 502/507
(58) Field of Search ................................. 502/159, 242, 502/232, 350, 353, 305, 321, 527.24

(56) References Cited

U.S. PATENT DOCUMENTS

| | | | |
|---|---|---|---|
| 3,166,895 A | | 1/1965 | Slayter et al. |
| 4,177,168 A | | 12/1979 | Denny et al. |
| 4,764,498 A | * | 8/1988 | Wissner et al. .............. 502/251 |
| 5,175,136 A | * | 12/1992 | Felthouse .................... 502/242 |
| 5,194,414 A | | 3/1993 | Kuma |
| 5,409,873 A | * | 4/1995 | Chung et al. ................ 502/152 |
| 5,821,186 A | * | 10/1998 | Collins ........................... 502/8 |
| 6,025,298 A | | 2/2000 | Imoto et al. |
| 6,086,844 A | | 7/2000 | Koike et al. |

FOREIGN PATENT DOCUMENTS

| | | |
|---|---|---|
| EP | 0 336 882 A1 | 10/1989 |
| EP | 0 398 765 A1 | 11/1990 |
| EP | 1 050 608 A1 | 11/2000 |
| JP | B2412183 | 3/1992 |
| JP | A564745 | 3/1993 |
| JP | 10-325021 | 12/1998 |
| JP | 11-5036 | 1/1999 |
| JP | A11216370 | 8/1999 |
| WO | WO97/32118 | 9/1997 |
| WO | WO99/36605 | 7/1999 |

* cited by examiner

*Primary Examiner*—Stanley S. Silverman
*Assistant Examiner*—Edward M. Johnson
(74) *Attorney, Agent, or Firm*—Birch, Stewart, Kolasch & Birch, LLP

(57) ABSTRACT

There are provided:
(i) an acid resistant catalyst sheet comprising:
 a catalyst component-containing titania fiber;
 a glass fiber; and
 at least one resin selected from the group consisting of an epoxy resin, a phenolic resin, a melamine resin, a furan resin, a polyimide resin, a silicone resin, a fluororesin, a polyphenylene sulfide resin and a polyether ether ketone resin; and
(ii) a process for producing an acid resistant catalyst sheet, which comprises the step of making paper from a mixture containing:
 a catalyst component-containing titania fiber;
 a glass fiber; and
 at least one resin selected from the group consisting of an epoxy resin, a phenolic resin, a melamine resin, a furan resin, a polyimide resin, a silicone resin, a fluororesin, a polyphenylene sulfide resin and a polyether ether ketone resin.

13 Claims, No Drawings

ACID RESISTANT CATALYST SHEET AND PROCESS FOR PRODUCING SAME

FIELD OF THE INVENTION

The present invention relates to an acid resistant catalyst sheet, and a process for producing the same, specifically, the present invention relates to an acid resistant catalyst sheet, whose catalytic activity can be retained for a long period of time, because a catalyst component contained therein hardly leaves from the catalyst sheet, and which is superior in its acid resistance against gases such as SOx and HCl and in its processability, and a process for producing said catalyst sheet. The acid resistant catalyst sheet in accordance with the present invention can be used preferably for, for example, reduction of nitrogen oxides, oxidation of organic substances and decomposition of dioxin.

BACKGROUND OF THE INVENTION

As a catalyst sheet known in the art, JP-B 4-12183 discloses a catalyst sheet, which is obtained by forming a titania fiber so as to be interwoven with a glass fiber in a manner such that the glass fiber is impregnated with a titania hydrosol, and then, the hydrosol is frozen in one direction, followed by fusion of the frozen portion.

Further, as another catalyst sheet known in the art, JP-B 5-64745 disclosed a catalyst sheet, which is obtained by impregnating a honeycomb laminate with a mixed dispersing agent comprising catalyst particles, silica sol and the like to fix the catalyst particles between fiber gaps of the honeycomb laminate and on the surfaces of the honeycomb laminate, wherein the honeycomb laminate comprises paper made from a mixture of a glass fiber, mountain leather and a binder.

Each of the references referred to above is incorporated herein by reference in its entirety.

Although the catalyst sheet disclosed in said JP-B 4-12183 has some degree of acid resistance, it has a problem that the titania fiber contained therein leaves from the sheet when vibrated mechanically because of rigidity of the sheet. Said catalyst sheet also has a problem that an additional different catalyst component contained therein leaves easily from the catalyst sheet because of poor bonding strength between the different additional catalyst component and the fibers, wherein said catalyst sheet can be produced according to the process described in said JP-B 4-12183.

On the other hand, the catalyst sheet disclosed in said JP-B 5-64745 has the following problems: (1) use of said silica sol and the like deteriorate properties of the catalyst particles contained therein, and (2) the catalyst particles contained therein leaves easily from the catalyst sheet.

SUMMARY OF THE INVENTION

Accordingly, an object of the present invention is to provide a catalyst sheet, whose catalytic activity can be retained for a long period of time, because a catalyst component contained therein hardly leaves from the catalyst sheet, and which is superior in its acid resistance against acid gases such as SOx and HCl and in its processability, and a process for producing said catalyst sheet.

The present inventors have undertaken extensive studies to develop an acid resistant catalyst sheet. As a result, it has been found that a catalyst sheet comprising a catalyst component-containing titania fiber, a glass fiber and a specific resin can solve the foregoing problems, and thereby the present invention has been obtained.

The present invention provides an acid resistant catalyst sheet comprising:
  a catalyst component-containing titania fiber;
  a glass fiber; and
  at least one resin selected from the group consisting of an epoxy resin, a phenolic resin, a melamine resin, a furan resin, a polyimide resin, a silicone resin, a fluororesin, a polyphenylene sulfide resin and a polyether ether ketone resin.

Further, the present invention provides a process for producing an acid resistant catalyst sheet, which comprises he step of making paper from a mixture containing:
  a catalyst component-containing titania fiber;
  a glass fiber; and
  at least one resin selected from the group consisting of an epoxy resin, a phenolic resin, a melamine resin, a furan resin, a polyimide resin, a silicone resin, a fluororesin, a polyphenylene sulfide resin and a polyether ether ketone resin.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAIL DESCRIPTION OF THE INVENTION

A catalyst component-containing titania fiber used in the present invention is not particularly limited. As examples of the catalyst component-containing titania fiber, those disclosed in JP-A 11-5036 and Japanese Patent Application No. 10-333786 are enumerated. Each of the references referred to above is incorporated herein by reference in its entirety. Here, the term, "titania fiber", means a fiber containing a $TiO_2$ component.

Specific examples of the catalyst component-containing titania fiber used in the present invention are those satisfying the following conditions (1) to (7):

(1) titanium oxide is contained in an amount of not less than about 50% by weight, provided that the weight of the catalyst component-containing titania fiber is assigned to be 100% by weight, (2) a fiber length is not less than about 50 $\mu$m, which length is not an average fiber length, but a length of respective fibers, (3) a fiber diameter is within a range of from about 2 to about 100 $\mu$m, (4) a specific surface area measured by a BET method is not less than about 10 $m^2/g$, and preferably from about 20 to about 300 $m^2/g$, (5) a pore volume measured by a nitrogen adsorption method is not less than about 0.05 cc/g, (6) a pore volume having a micro pore radius of not less than 10 Å is not less than about 0.02 cc/g, and (7) a pore radius peak is from about 10 to about 300 Å, and preferably from about 10 to about 100 Å.

A catalyst component used in the present invention is not particularly limited, and may be appropriately selected depending on uses of the catalyst sheet. Examples of the catalyst component usually used are at least one metal selected from the group consisting of V, W, Al, As, Ni, Zr, Mo, Ru, Mg, Ca, Fe, Cr and Pt, at least one metal oxide selected from the group consisting of oxides of said metals, and at least one composite oxide selected from the group consisting of composite oxides of said metals.

When the catalyst sheet in accordance with the present invention is used for reducing nitrogen oxides, it is recommendable to use, as the catalyst component, at least one preferred metal selected from the group consisting of V, W and Mo, or at least one metal oxide selected from the group consisting of oxides of said preferred metals, or at least one composite oxide selected from the group consisting of composite oxides of said-prefer-red metals.

An amount of the catalyst component contained in the catalyst sheet is not particularly limited, and may be determined depending on uses of the catalyst sheet. The amount of the catalyst component is usually from about 0.001 to about 50% by weight in terms of metal oxide, provided that said metal contained in the catalyst sheet is converted into its metal oxide, and the weight of the catalyst component-containing titania fiber is assigned to be 100% by weight.

A process for producing the catalyst component-containing titania fiber is not particularly limited. As examples of the production process thereof, those comprising the steps mentioned in the following Process-1 and Process-2 are enumerated. It is necessary to carry out respective steps of from Step-1 to Step-4 under atmosphere of an inert gas such as nitrogen gas, through which steps a precursor fiber is obtained. However, the obtained precursor fiber can be handled in the air.

Process-1

Step-1 of dissolving a titanium alkoxide in an alcohol such as isopropyl alcohol to obtain a solution, Step-2 of hydrolyzing the obtained solution to obtain a slurry, Step-3 of dissolving a vanadium compound in the slurry to obtain a spinning solution, Step-4 of spinning the spinning solution to obtain a precursor fiber, and Step-5 of calcining the precursor fiber to obtain a titania fiber.

Process-2

Step-1 of dissolving a titanium alkoxide and a vanadium compound in an alcohol such as isopropyl alcohol, Step-2 of hydrolyzing the obtained solution to obtaining a slurry, Step-3 of adding a solvent to the slurry, followed by mixing, and then further adding a silica compound thereto to obtain a spinning solution, Step-4 of spinning the spinning solution to obtain a precursor fiber, and Step-5 of calcining the precursor fiber to obtain a titania fiber.

A unit weight of the catalyst component-containing titania fiber present in the catalyst sheet in accordance with the present invention is not particularly limited, and may be determined depending on uses of the catalyst sheet. Here, the term, "unit weight", means a weight of the catalyst component-containing. titania fiber per unit area of the sheet. From a viewpoint of increasing catalyst performance and permeability of the obtained catalyst sheet, a preferred unit weight of the catalyst component-containing titania fiber is from about 5 to about 900 g/m$^2$.

A glass fiber used in the present invention is not particularly limited. Preferred glass fiber is that having an average fiber diameter of from about 0.5 to about 5 μm, and preferably from about 0.6 to about 2.0 μm, and an average fiber length of from about 7 to about 50 mm, and preferably from about 10 to about 40 mm, in order to obtain a catalyst sheet having high strength from a viewpoint of strong intertwining among the glass fiber. When the fiber length exceeds about 50 mm, it may not be easy to disperse the glass fiber in water during making paper. An alkali silicate glass fiber is preferred in order to obtain a catalyst sheet having better acid resistance. An example of the alkali silicate glass fiber is that of a trademark of CMLF 208-RW 36, manufactured by Nippon Sheet Glass Co., Ltd.

A unit weight of the glass fiber present in the catalyst sheet in accordance with the present invention is not particularly limited, and may be determined depending on uses of the catalyst sheet. Here, the term, "unit weight", means a weight of the glass fiber per unit area of the sheet. From a viewpoint of balance among retaining ability of the catalyst component-containing titania fiber, paper strength and permeability of the catalyst sheet obtained, a preferred unit weight of the glass fiber is from about 5 to about 900 g/m$^2$.

A resin used in the present invention, namely an epoxy resin, a phenolic resin, a melamine resin, a furan resin, a polyimide resin, a silicone resin, a fluororesin, a polyphenylene sulfide resin or a polyether ether ketone resin, has a good acid resistance. These resins may be those obtained by a conventional production process. Among them, a fluororesin is preferable from a viewpoint of heat resistance and alkali resistance of the catalyst sheet obtained.

A process for producing the acid resistant catalyst sheet in accordance with the present invention is not particularly limited. An example of said production process is a process comprising the step of making paper from a mixture containing the catalyst component-containing titania fiber, the glass fiber and the above-mentioned resin. From a viewpoint of preventing the catalyst component from eluting out of the catalyst component-containing titania fiber, a preferable production process of the catalyst sheet is a process, which comprises the step of making paper from a mixture containing the catalyst component-containing titania fiber, the glass fiber and the above-mentioned resin, in the presence of at least one surfactant selected from the group consisting of alkyl dimethylaminoacetate betaines represented by the following formula (I), alkylamine acetates represented by the following formula (II) and amines represented by the following formula (III):

wherein $R_1$ is a $C_8$–$C_{22}$ alkyl group,

wherein $R_2$ is a $C_8$–$C_{22}$ alkyl group, and

wherein X is a hydrogen atom or a methyl group, Y is a hydrogen atom or a methyl group, and $R_3$ is a $C_8$–$C_{22}$ alkyl group.

Particularly preferred surfactants are lauryl dimethylaminoacetate betain, tridecyl dimethylaminoacetate betain and myristyl dimethylaminoacetate betain, which are represented by the formula (I); laurylamine acetate, tridecylamine acetate and myristylamine acetate, which are represented by the formula (II); and lauryl-dimethylamine, tridecyl-dimethylamine and myristyl-dimethylamine, which are represented by the formula (III).

How to make paper from the mixture containing the catalyst component-containing titania fiber, the glass fiber and the above-mentioned resin is not particularly limited. For example, a process comprising the following steps 1 to 3 can be given.

Step-1 of placing water, the glass fiber, the above-mentioned resin, a surfactant and the catalyst component-containing titania fiber in this order in a pulp disaggregating machine under stirring, and mixing them to obtain a uniform mixture thereof, Step-2 of making wet paper from the above-mentioned uniform mixture using a paper-making machine, and Step-3 of dehydrating and drying the wet paper to obtain a catalyst sheet.

In the above Step-1, it is usually preferable to carry out said step under conditions of making a length of the catalyst component-containing titania fiber not less than about 10 μm, and making a length of the glass fiber not less than about 7 mm. In said step, if desired, a defoaming agent such as polyether type deforming agents, ester of fatty acid type defoaming agents and silicone type defoaming agents may be used. Additionally, in said step, an inorganic binding agent such as an alumina sol, a silica sol, a titania sol and a zirconia sol may be used to improve strength of the wet paper obtained in the above Step-2.

In the above Step-2, the above-mentioned inorganic binding agent may be sprayed to the wet paper, from a viewpoint of increasing strength of the wet paper.

In the above Step-3, conditions of dehydrating and drying are not particularly limited. Said step may be carried out under conventional conditions using an apparatus known in the art. Drying may be carried out two or more times, wherein temperature may be different from one another. In addition, drying maybe carried out after installing the acid resistant catalyst sheet in, for example, a reaction apparatus for reducing nitrogen oxides.

The acid catalyst sheet obtained in accordance with the present invention is a catalyst sheet, whose catalytic activity can be retained for a long period of time, because a catalyst component contained therein hardly leaves from the catalyst sheet, and which is superior in its acid resistance and processability. For example, the present catalyst sheet is generally resistant to at least about 10 hour use at about 100 to about 300° C. against acid gases such as SOx and HCl. The present catalyst sheet is capable of retaining for a long period of time its catalytic activity for reducing nitrogen oxides, oxidizing organic substances such as organic solvents, agricultural chemicals and surfactants, and decomposing dioxin. Thus, it can be said that its utility value is great from an industrial point of view.

EXAMPLE

The present invention is illustrated in more detail with reference to the following Examples, which are only illustrative, and are not limitative for the scope of the present invention.

A BET specific surface area ($m^2/g$), a total pore volume (cc/g) and a pore volume (cc/g) having a pore radius of not less than 10 Å of a catalyst component-containing titania fiber were measured using a pulverized product, which was obtained by mildly pulverizing said catalyst component-containing titania fiber with a mortar, by means of a continuous volume method with a nitrogen gas(a nitrogen adsorption method),by using a gas adsorption/desorption analyzer OMUNISOAP Model 360 (manufactured by COULTER Co.), wherein, prior to measuring, said analyzer was vacuumed at 130° C. for 6 hours, until a degree of vacuum in said analyzer reached $6 \times 10^{-5}$ Torr or less.

Example 1
Production of Catalyst Component-containing Titania Fiber

A solution was prepared by dissolving 300 g of titanium tetra-isopropoxide (first grade reagent), as a titanium alkoxide, manufactured by Wako Pure Chemical Industries, Ltd., 51.2 g of triethoxyvanadyl manufactured by Kojund Chemical Loboratory Co., Ltd., and 55.0 g of ethyl acetoacetate (special grade reagent), as an active hydrogen-carrying compound, manufactured by Wako Pure Chemical Industries, Ltd., in 55.4 g of isopropyl alcohol (special grade reagent), as a solvent, manufactured by Wako Pure Chemical Industries, Ltd.

The obtained solution was refluxed for 1 hour under nitrogen atmosphere. Here, the amount of triethoxyvanadyl used was controlled to be 19% by weight in terms of vanadium oxide ($V_2O_5$) present in the catalyst component-containing titania fiber obtained hereinafter, provided that the weight of the catalyst component-containing titania fiber was assigned to be 100% by weight; and a molar ratio of the amount of ethyl acetoacetate used to the amounts of titanium tetra-isopropoxide used was 0.40.

A mixture of 37.9 g of water and 342 g of isopropyl alcohol was added to the above-mentioned solution under stirring, while boiling and refluxing said solution under nitrogen atmosphere, and distilling out isopropyl alcohol. Here, the distilling rate of isopropyl alcohol was controlled so as to be the same as the adding rate of the above-mentioned mixture, and the total adding time of said mixture was controlled to be 108 minutes. A water concentration in the above-mentioned mixture of water and isopropyl alcohol was 10% by weight, and the total amount of water in said mixture was 2.0 times (molar ratio) the amount of titanium tetra-isopropoxide used. Nearly when the amount of said mixture added reached that corresponding to 1.8 moles of water per 1 mole of titanium tetra-isopropoxide, deposition of a polymer began to appear, and when the total amount of said mixture had been added, a complete slurry was obtained.

The slurry was refluxed for 1 hour, successively heated to distill out the solvent, and was concentrated up to a Ti concentration of $3.46 \times 10^{-3}$ mole/g. The amount of water distilled out of the system up to the present operation was found to be 0.07 mole per 1 mole of titanium tetraisopropoxide. Therefore, a difference between the amount of water added and the amount of water distilled out of the system together with the solvent or others was found to be 1.93 moles (=2.0 moles−0.07 mole) per mole of titanium tetraisopropoxide.

To the concentrated slurry obtained, 352 g of an organic solvent, tetrahydrofuran (special grade reagent) manufactured by Wako Pure Chemical Industries, Ltd., was added, and the obtained mixture was refluxed for 1 hour to dissolve the above-mentioned polymer. To the resulting solution, 37.2 g of ethyl silicate, a trademark of ETHYL SILICATE 40, manufactured by Tama Chemicals Co., Ltd., was added, and the mixture was refluxed for 1 hour to obtain a polymer solution. Here, the amount of ethyl silicate added was 12% by weight in terms of silica ($SiO_2$) present in the catalyst component-containing titania fiber obtained hereinafter, provided that the weight of the catalyst component-containing titania fiber was assigned to be 100% by weight.

The polymer solution obtained was filtered with a TEFLON-made membrane filter having a 3 μm pore diameter, and the filtrate obtained was heated to distill out the solvent mixture of isopropyl alcohol and tetrahydrofuran, thereby obtaining 200 g of a spinning solution having a viscosity of 50 poise (40° C.).

The spinning solution kept at 40° C. was extruded in a fibrous form to an air atmosphere of temperature of 40° C. and relative humidity of 60% through a nozzle having an aperture of 50 μm with the aid of a nitrogen gas of 20 Kg/cm$^2$ pressure, and the fiber was wound at a speed of 70 m/min., thereby obtaining a precursor fiber.

The precursor fiber obtained was steam-treated for 15 hours in a thermo-hygrostat kept at relative humidity of 95% (partial pressure of steam=0.54 atmospheric pressure) and temperature of 85° C. The steam-treated fiber was placed in a calcining furnace of air atmosphere, and temperature of the calcining furnace was raised from room temperature to 500° C. at a raising rate of 200° C./hr. Cacining was continued for 1 hour at 500° C. thereby obtaining a catalyst component-containing titania fiber having a fiber diameter of 15 μm. The catalyst component-containing titania fiber obtained was found to have a BET specific surface area of 173 m$^2$/g, the total micro pore volume of 0.15 cc/g, a micro pore volume having a pore diameter of not less than 10 Å of 0.15 cc/g, and a unit weight of 150 g/m$^2$.

Production of Catalyst Sheet 3.13 g of a glass fiber having a unit weight of 50 g/m$^2$, a trademark of C GLASS-MICROFIBER CMLF 208-RW36, manufactured by Nippon Sheet Glass Company, Ltd., 2.08 g of PTFE dispersion (polytetrafluoroethylene content=60% by weight) having a unit weight of 20 g/m$^2$, a trademark of FLUON DISPERSION AD1, manufactured by Asahi Glass Co., Ltd., and 0.10 g of a cationic surfactant, a trademark of TE-5, manufactured by Sumitomo Chemical Co., Ltd., were added in 1 liter of water in this order, and thereafter, the mixture was mixed under stirring with a mixer, a trademark of VA-W TYPE 25, made by Hitachi, Ltd., thereby obtaining a mixture.

To the mixture obtained, 1.88 g of lauryl dimethylaminoacetate betain (a surfactant having an effective component of 26% by weight), a trademark of AMPHITOL 24B, manufactured by Kao Corporation, 9.38 g of the catalyst component-containing titania fiber obtained above, and 2.00 g of a defoaming agent, a trademark of FOAMLESS P-98, manufactured by MEISEI CHEMICAL WORKS, Ltd., were added in this order, and thereafter, the mixture was mixed with the mixer mentioned above.

To the mixture obtained, 7 litters of water was added, and after mixing the mixture under stirring, a wet paper was obtained using a square form sheet machine made by KUMAGAIRIKI Co., Ltd. The wet paper obtained was dehydrated and dried to obtain a catalyst sheet having a unit weight of 220 g/m$^2$ and a square size of 250 mm×250 mm.

Example 2

4.82 g of a titania sol (titanium oxide concentration=1.3% by weight), a trademark of TKC-301, manufactured by Tayca Corporation was sprayed to the wet paper obtained in Example 1, wherein the amount of the titania sol used corresponded to 1.0 g of the titania sol per 1 m$^2$ of the wet paper. The resulting paper was dehydrated, and then dried at 350° C. for 1 hour to obtain a catalyst sheet having a unit weight of 221 g/m$^2$ and a square size of 250 mm×250 mm.

Example 3

Production of Catalyst Component-containing Titania Fiber

A solution was prepared by dissolving 600 g of titanium tetra-isopropoxide (first grade reagent), as a titanium alkoxide, manufactured by Wako Pure Chemical Industries, Ltd., 165 g of vanadium isopropoxide manufactured by NICHIA CHEMICAL INDUSTRIES, LTD., and 110 g of ethyl acetoacetate (special grade reagent) manufactured by Wako Pure Chemical Industries, Ltd. in 125 g of isopropyl alcohol (special grade reagent), as a solvent, manufactured by Wako Pure Chemical Industries, Ltd. The obtained solution was refluxed for 1 hour under nitrogen atmosphere.

A mixture (water concentration=10% by weight) of 87.2 g of water and 786 g of isopropyl alcohol was added to the above-mentioned refluxed solution under stirring, while boiling and refluxing said solution under nitrogen atmosphere, and distilling out isopropyl alcohol, and thereby obtaining a polymer slurry.

The slurry obtained was refluxed for 1 hour under nitrogen atmosphere, successively heated to distill out the solvent, and was concentrated. To the concentrated slurry obtained, 711 g of an organic solvent, tetrahydrofuran (special grade reagent) manufactured by Wako Pure Chemical Industries, Ltd., was added, and the obtained mixture was refluxed for 1 hour to dissolve the above-mentioned polymer.

The polymer solution obtained was filtered under nitrogen atmosphere with a TEFLON-made membrane filter having a 3 μm pore diameter, and the filtrate obtained was heated to distill out the solvent mixture of isopropyl alcohol and tetrahydrofuran, thereby obtaining 694 g of a spinning solution having a viscosity of 50 poise (40° C.).

The spinning solution kept at 40° C., was extruded to an air atmosphere of temperature of 40° C. and relative humidity of 60% through a nozzle having an aperture of 50 μm with the aid of a nitrogen gas of 20 Kg/cm$^2$ (2 Mpa)pressure, thereby obtaining a precursor fiber.

The precursor fiber obtained was steam-treated for 18 hours in a thermo-hygrostat kept at relative humidity of 100% (partial pressure of steam=0.46 MPa) and temperature of 150° C. The steam-treated fiber was placed in a calcining furnace of air atmosphere, and temperature of the calcining furnace was raised from room temperature to 350° C. at a raising rate of 200° C./hr. Calcining was continued for 1 hour at 350° C., thereby obtaining a catalyst component-containing titania fiber having a fiber diameter of 15 μm. The catalyst component-containing titania fiber obtained was found to have a BET specific surface area of 197 m$^2$/g, a total micro pore volume of 0.18 cc/g, and a pore volume having a pore diameter of not less than 10 Å of 0.18 cc/g.

Production of Catalyst Sheet 3.13 g of a glass fiber, a trademark of C GLASS-MICROFIBER CMLF 208-RW36, manufactured by Nippon Sheet Glass Co., Ltd., 2.08 g of PTFE dispersion (polytetrafluoroethylene content=60% by weight), a trademark of FLUON DISPERSION AD1, manufactured by Asahi Glass Co., Ltd., and 0.10 g of a cationic surfactant, a trademark of TE-5, manufactured by Sumitomo Chemical Co., Ltd., were added in 1 liter of water, and thereafter, the mixture obtained was mixed under stirring with a mixer, a trademark of VA-W TYPE 25, made by Hitachi, Ltd., thereby obtaining a mixture.

To the mixture obtained, 1.88 g of lauryl dimethylaminoacetate betain (a surfactant having an effective component of 26% by weight), a trademark of AMPHITOL 24B, manufactured by Kao Corporation, 9.38 g of the catalyst component-containing titania fiber obtained above, and 2.00 g of a defoaming agent, a trademark of FOAMLESS P-98, manufactured by MEISEI CHEMICAL WORKS, Ltd., were added in this order, and thereafter, the mixture was mixed with the mixer mentioned above.

To the mixture obtained, 7 litters of water was added to obtain a pulp liquid. A paper was made from the liquid, and then, a catalyst sheet having a unit weight of 200 g/m² and a square size of 250 mm×250 mm was obtained from the paper.

Evaluation of Catalyst Sheet

A nitrogen oxide removal efficiency of a circular test sheet having a diameter of 70 mm, which was obtained easily by punching the catalyst sheet mentioned above, was found to be not less than 90%, wherein the nitrogen oxide removal efficiency was measured by a method consisting of the steps of:

(1) putting the circular test sheet between two felt sheets, (2) fixing the resultant obtained between two glass-made rings having an inside diameter of 53 mm and an outside diameter of 70 mm, (3) putting the fixed material obtained above in a tubular reactor so as to make a mixed gas mentioned below to pass through the portion of the above-mentioned inner diameter 53 mm, (4) passing a mixed gas, which comprises NO (100 ppm), $NH_3$ (100 ppm) and $O_2$ (10%), and has a temperature of 200° C., through the above-mentioned tubular reactor at a flow rate of 1.27 NL/min. (linear speed=1.0 m/min.), (5) measuring NO gas concentrations at both an inlet and an outlet of the tubular reactor using an automatic $NO_x$ measuring instrument (Type ECL-77A manufactured by YANAGIMOTO MFG. CO., LTD.), and (6) calculating a trogen oxide removal efficiency by the following equation:

Nitrogen oxide removal efficiency (%)=(NOx concentration at inlet−NOx concentration at outlet)×100/NOx concentration at inlet.

As mentioned above, the catalyst sheet obtained had a superior processability, that is, it was easy to make a test sheet by punching the catalyst sheet, and had a sufficient catalytic activity.

What is claimed is:

1. An acid resistant catalyst sheet comprising:
    a catalyst compound component-containing titania fiber;
    a glass fiber; and
    at least one resin selected from the group consisting of an epoxy resin, a phenolic resin, a melamine resin, a furan resin, a polyimide resin, a silicone resin, a fluororesin, a polyphenylene sulfide resin and a polyether ether ketone resin,
    wherein said glass fiber and said titania fiber are tangled with each other in said catalyst sheet; and
    a unit weight of the catalyst component-containing titania fiber in said catalyst sheet is in the range of from about 5 g/m² to about 900 g/m².

2. The acid resistant catalyst sheet according to claim 1, wherein a BET specific surf ace area of the catalyst component-containing titania fiber is from about 20 to about 300 m²/g.

3. The acid resistant catalyst sheet according to claim 1, wherein a BET specific surface area of the catalyst component-containing titania fiber is from about 20 to about 300 m²/g.

4. The acid resistant catalyst sheet according to claim 3, wherein the catalyst component-containing titania fiber has a pore radius peak of from about 10 to about 100 Å, a pore volume of not less than about 0.05 cc/g, and a pore volume of pores having a pore radius of not less than 10 Å of about 0.02 cc/g or more.

5. The acid resistant catalyst sheet according to claim 4, wherein the catalyst component in the catalyst component-containing titania fiber comprises at least one metal selected from the group consisting of V, W and Mo, or at least one oxide selected from the group consisting of oxides of said metals, or at least one composite oxide elected from the group consisting of composite oxides of said metals.

6. The acid resistant catalyst sheet according to claim 5, wherein the resin comprises a fluororesin.

7. The acid resistant catalyst sheet according to claim 1, wherein the catalyst component-containing titania fiber has a pore radius peak of from about 10 to about 100 Å, a pore volume of not less than about 0.05 cc/g, and a pore volume of pores having a pore radius of not less than 10 Å of about 0.02 cc/g or more.

8. The acid resistant catalyst sheet according to claim 1, wherein the catalyst component in the catalyst component-containing titania fiber comprises at least one metal selected from the group consisting of V, W and Mo, or at least one oxide selected from the group consisting of oxides of said metals, or at least one composite oxide selected from the group consisting of composite oxides of said metals.

9. The acid resistant catalyst sheet according to claim 1, wherein the glass fiber has an average fiber diameter of from about 0.5 to about 5 μm and an average fiber length of from about 7 to about 50 mm.

10. The acid resistant catalyst sheet according to claim 1, wherein the glass fiber comprises an alkali silicate glass fiber.

11. The acid resistant catalyst sheet according to claim 1, wherein the resin comprises a fluororesin.

12. A process for producing an acid resistant catalyst sheet, which comprises the steps of:
    mixing
        a catalyst component-containing titania fiber,
        a glass fiber and
        at least one resin selected from the group consisting of an epoxy resin, a phenolic resin, a melamine resin, a furan resin, a polyimide resin, a silicone resin, a fluororesin, a polyphenylene sulfide resin and a polyether ether ketone resin, to obtain a mixture thereof; and
    forming a sheet of the mixture;
    wherein said glass fiber and said titania fiber are tangled with each other in said catalyst sheet; and
    wherein a unit weight of the catalyst component-containing titania fiber in said catalyst sheet is in the range of from about 5 g/m² to about 900 g/m².

13. The process according to claim 12, wherein the mixture further contains at least one surfactant selected from the group consisting of an alkyl dimethylaminoacetate betaine represented by the following formula (I), an alkylamine acetate represented by the following formula (II) and an amine represented by the following formula (III):

(I)
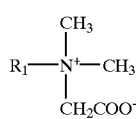
wherein R₁ is a C₈–C₂₂ alkyl group,
(II)
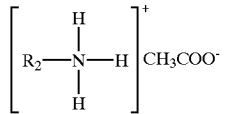
wherein R₂ is a C₈–C₂₂ alkyl group, and
(III)
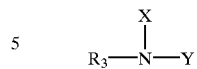
wherein X is a hydrogen atom or a methyl group, Y is a hydrogen atom or a methyl group, and R₃ is a C₈–C₂₂ alkyl group.
* * * * *